United States Patent [19]

Kamijo et al.

[11] Patent Number: 4,753,764

[45] Date of Patent: Jun. 28, 1988

[54] MANUFACTURING METHOD FOR FIBER REINFORCED SILICON CERAMICS SINTERED BODY

[75] Inventors: Eiji Kamijo; Matsuo Higuchi; Osamu Komura, all of Itami, Japan

[73] Assignee: Sumitomo Electric Industries, Ltd., Osaka, Japan

[21] Appl. No.: 534,143

[22] Filed: Sep. 21, 1983

[30] Foreign Application Priority Data

| | | | |
|---|---|---|---|
| Sep. 24, 1982 | [JP] | Japan | 57-167192 |
| Sep. 24, 1982 | [JP] | Japan | 57-167193 |
| Sep. 24, 1982 | [JP] | Japan | 57-167194 |
| Sep. 24, 1982 | [JP] | Japan | 57-167195 |
| Sep. 28, 1982 | [JP] | Japan | 57-170154 |
| Sep. 28, 1982 | [JP] | Japan | 57-170155 |
| Sep. 28, 1982 | [JP] | Japan | 57-170156 |
| Sep. 28, 1982 | [JP] | Japan | 57-170157 |

[51] Int. Cl.[4] ........................ C04B 35/56; C04B 35/58

[52] U.S. Cl. ........................................ 264/63; 264/65; 501/88; 501/90; 501/95

[58] Field of Search ............... 501/95, 88, 90; 264/65, 264/63

[56] References Cited

U.S. PATENT DOCUMENTS 4,097,293 6/1978 Komeya ................................ 264/65

FOREIGN PATENT DOCUMENTS 56-100168 8/1981 Japan .................................... 501/95

OTHER PUBLICATIONS

Japanese Pat. Pub. 57-101000, 6/82.

Japanese Pat. Pub. 57-111300, 7/82.

*Primary Examiner*—James Derrington

*Attorney, Agent, or Firm*—Wenderoth, Lind & Ponack

[57] ABSTRACT

A method for manufacturing a fiber reinforced silicon carbide or silicon nitride ceramic sintered body having silicon carbide or silicon nitride ceramic whiskers dispersed therein, which method involves mixing together silicon carbide or silicon nitride ceramic powder, whisker formation agents made up of at least one material selected from metal Si or an inorganic compound containing Si, an organic containing Si, amorphous silicon ceramic powder or a mixture of $SiO_2$ and carbon, or Si, sintering additives, and a whisker accelerating amount of a whisker formation accelerator selected from Fe, Ni, Co, Cr, V, Ti, Ta, W or Mo; molding the mixture into a predetermined shape; heat treating the molded body at a temperature of 1300° C. to 1750° C. to produce silicon carbide or silicon nitride whiskers in the molded body and thereafter densifying and sintering the molded body at sintering temperatures in a non-oxidizing atmosphere. The silicon carbide and silicon nitride ceramics produced by said method have excellent heat-resistance characteristics and excellent impact and corrosion resistance, thus making these ceramics eminently suitable for structural materials where these properties are required.

6 Claims, No Drawings

MANUFACTURING METHOD FOR FIBER REINFORCED SILICON CERAMICS SINTERED BODY

This invention relates to heat resistant ceramic sintered bodies, and more particularly to silicon ceramic sintered bodies, such as silicon carbide and silicon nitride or the like.

Silicon carbide and silicon nitride among heat resistant ceramics are superior especially in heat resistance, heat and impact resistance and corrosion resistance, and effective as structural materials and part materials for a turbine or a diesel engine used in a high temperature gas environment, and therefore the development of these ceramics are important.

The use of heat resistant ceramic sintered body as the above structural material requires physical and chemical stability at high temperatures, especially an excellent mechanical characteristic.

Silicon nitride and silicon carbide are compounds of covalent bonding property and are difficult to sinter.

Accordingly, they are not sintered alone, but added with sintering additives of several to several ten % to be formed in low melting point compounds for sintering.

For example, for silicon carbide, the sintering additives: Al, B, $B_4C$, and $Al_2O_3$ are added individually or in plural combinations in amounts of 1 to 20%. For silicon nitride, it is the same: MgO, $Al_2O_3$, $Y_2O_3$ are added individually or in plural combinations in amounts of 5 to 20%. The mixture of materials are then subjected to hot press, thereby obtaining sintered bodies of about theoretical densities.

Such sintered bodies, however, are of insufficient strength at high temperatures.

In other words, Al, B, $B_4C$, MgO, $Al_2O_3$ or $Y_2O_3$ as sintering additives are advantageous in that low melting point compounds are formed as aforesaid to promote the sintering, but the strength of the compounds are deteriorated at high temperatures due to the low melting point compounds.

Hence, research has been carried out to reduce the kind or amount of sintering additives as much as possible during the manufacture of silicon nitride or silicon carbide sintered bodies, but at present, the defects of deteriorating strengths at high temperatures remains unsolved.

In the light of the above problems, the inventors, after earnest research to obtain sintered bodies superior in strength at high temperatures as well as heat resistance, have discovered a method for manufacturing a silicon nitride sintered body reinforced with fiber whiskers, and have previously filed Japanese Patent Applications (Patent Laid-Open Gazette No. SHO 56-92180 and No. SHO 56-100618).

The whiskers generally are monocrystal fibers and said to have strength several ten to several hundred times as large as that of polycrystal fibers.

Monocrystal fibers have been widely studied as the ideal material for whisker formation because this material has no deterioration at a high temperatures, it is a reinforcing agent due to the entanglement of the monocrystal fibers, and strength is improved at high temperatures even when sintering additives are mixed therewith, but the use of such materials have not yet put into practice.

The aforesaid Patent Application provides for a sintered body manufacturing method which makes it industrially easy to disperse whiskers into silicon carbide or silicon nitride sintered bodies, so that sintered bodies are obtained which are of high strength and have less deterioration in strength, even at high temperatures.

Such manufacturing method, however, mixes the whiskers when the material powder is mixed, and thereafter the mixture is press-molded, so that the whiskers are not uniformly mixed, or lead to alignment in the specified direction only, thereby creating problems in that the strength of the sintered body is directionally different.

An object of the invention is to provide a method for manufacturing silicon ceramics sintered bodies, which is characterized in that the silicon carbide or silicon nitride sintered body is produced by conventional methods and also is capable of entirely eliminating the above various defects. This invention is directed to an improvement in the method for manufacturing a silicon ceramics sintered body reinforced by silicon ceramic whiskers, such as silicon carbide whiskers or silicon nitride whiskers.

The conventional technique has been defective in that uniform mixing and mass-mixing have proven difficult because the fiber whiskers have been mixed with the granular raw materials simultaneously with mixing thereof.

The defect in the conventional method has been eliminated by mixing the granular whisker formation agent with the powder under heat treatment produce the whiskers, and then sintering the material. Such method, however, has been defective in that the whisker grows at a length of 10 to 50μ and is not uniform.

After researching this problem, the present invention has been disigned to obtain a novel and industrially easy method for manufacturing the sintered material, making it easy to uniformly mix the granular raw material, sintering additives and fiber whiskers, thus allowing the whiskers to grow in uniform and optimum lengths within the sintered body.

This invention will now be discussed in detail.

The manufacturing method of the present invention is achieved by mixing the granular raw material and sintering additives with a whisker formation agent granular to be whiskered under heat treatment, instead of fiber whiskers, so that the mixture is molded in a predetermined shape. The molded material is then subjected to heat treatment at a temperature of 1300° C. or more, preferably 1400° to 1750° C., in a non-oxidizing atmosphere, fiber whiskers are produced from the mixed granular whisker formation agent in the molded material, and thereafter the temperature is further raised to carry out a densifying-sintering operation under the non-oxidizing atmosphere to increase the density and sinter the molded material, thereby manufacturing the fiber reinforced silicon carbide sintered body.

This invention employs a method for manufacturing a sintered body, by which a powder mixture of a whisker formation agent, which forms whiskers under heat treatment, a raw powder material, and sintering additives, are subjected to a whisker formation heat treatment at a temperature of 1300° to 1750° C. in a non-oxidizing atmosphere, and thereafter molded into the predetermined shape. The molded material is then sintered continuously under a non-oxidizing atmosphere.

In the present invention, the raw material powder and sintering additives are not particularly defined, since they are of a well-known crystal structure and chemical composition.

The whisker formation agents to be mixed need only generate gaseous SiO in a non-oxidizing atmosphere, whereby the whisker growing occurs through the gaseous phase of SiO. The inventors have found that the effect is the same as the aforesaid when using the whisker formation agents made of of; one or more groups selected from inorganic compounds containing Si, such as metallic Si, SiO, $SiO_2$, etc. and organic compounds containing Si, such as silicon rubber, silicon resin, etc.; and one or more groups selected from carbon and organic substance which produces carbon by thermal decomposition.

In addition, the amount of whisker formation agent to be compounded is preferably 1 to 75 wt.%, because if it is less than 1 wt.% it is not effective and if it is more than 75 wt.% it adversely lowers the strength, where in the case of using raw materials of silicon carbide, the compounding amount of whisker formation agent preferably has an upper limit of less than 70 wt.%.

An accelerator, when added to the mixture of raw material powder, sintering additives and whiskers formation agents, is effective to produce the whisker uniformly and rapidly.

The whisker formation accelerator may be any metal or alloy which solid-solves Si, $N_2$ into the liquid phase at the temperatures employed for the whisker formation heat treatment, from which the inventors have found that one or more metals and/or alloys selected from Fe, Ni, Co, Cr, V, Ti, Ta, W and Mo is preferably added in amounts of 0.01 to 5 wt.%. These alloys, when added and mixed, are converted into the liquid phase at the whisker formation heat treatment temperatures so that the growth of whiskers are promoted by the well-known VLS (Vapour-Liquid-Solidification) mechanism which have the effect of producing relatively long whiskers of about 40 to 50 μm in a short time.

In addition, the whisker formation accelerator, when controlled, in its amount, as well as the kind and formation process conditions, can be further controlled to produce further longer whiskers.

The details of the above are given in the Japanese Patent Application (Patent Laying-Open Gazette No. SHO 57-101000 and No. SHO 57-111300) filed by some of the present inventors.

In brief, in the present invention, the granular whisker formation agent together with the raw material powder and sintering additives are used to carry out the whisker formation heat treatment before or after molding and then the molded material is sintered and densified to obtain a fiber reinforced ceramics sintered body. The conventional sintering method, which produces fibrous structure by the dissolving deposition mechanism of the liquid phase and $Si_3N_4$ or SiC simultaneously with proceeding (densifying) of sintering, is defective in that the fiber grows in such a manner so as to selectively fill gaps and not to obtain a large aspect ratio. On the contrary, the method of the invention produces whiskers and grows them in condition of void ratio of 40 to 50% prior to densifying, thereby enabling one to obtain fibrous structure of a sufficiently larger aspect ratio.

The whisker formation heat treatment condition is preferably carried out at a temperature of 1300° to 1750° C. under a non-oxidizing atmosphere for more than one hour necessary to obtain an effective aspect ratio in consideration of the atmosphere and temperature.

In the case where the silicon nitride powder and silicon nitride whisker are used for as raw material powder and whisker respectively, it is preferable that the atmosphere for whisker formation heat treatment and the densifying and sintering operation be carried out under a non-oxidizing atmosphere having a nitrogen gas partial pressure and wherein the heat treatment temperature is 1400° to 1650° C.

The Examples of the present invention will be discussed in detail.

EXAMPLE 1

SiC powder of 74 wt.% was added with $B_4C$ powder of 2 wt.% as sintering additives with $SiO_2$ of 20 wt.% and C of 4 wt.% as whisker formation agents, which were ground by use of a ball mill for 120 hours and mixed.

The mixed powder was press-molded at 2 ton/cm$^2$ by use of a metal mold press.

The molded material was subjected to heat treatment for two hours in vacuum of 1550° C., $1\times10^{-3}$ Torr, continuously raised to a temperature of 2050° C. in an atmosphere of argon under one atmospheric pressure, held for one hour, and subjected to a densifying-sintering step.

The sintered test piece obtained was then measured for its transverse rupture strength by three-point bending at a 20 mm span and the broken surface observed by use of SEM (scanning election microscope).

Similarly, various whisker formation agents shown in Table 1 were added to form the molded materials, which were sintered after heat treatment, so that the results of measuring the test pieces were also shown in Table 1.

In addition, the results of measurement as the comparative examples were shown in Table 1, in which a molded material containing a whisker formation agent of less than 1 wt.% and that of more than 70 wt.% and a molded material containing no whisker formation agents, were subjected to heat treatment and sintering under the same conditions as Example 1.

TABLE 1

| | | SiC Raw Material Powder Compounding Amount (weight %) | Sintering Additives ($B_4C$) Adding Amount (weight %) | Whisker Formation Agent Kinds | Whisker Formation Agent Adding Amount (weight %) | Transverse Rupture Strength (kg/mm$^2$) |
|---|---|---|---|---|---|---|
| Example | 1 | 74 | 2 | $SiO_2$ | 20 | 64 |
| | | | | C | 4 | |
| | 2 | 76 | 2 | $SiO_2$ | 15 | 65 |
| | | | | Si | 2 | |
| | | | | C | 5 | |
| | 3 | 52 | 2 | Silicon Resin | 20 | 62 |
| | | | | $SiO_2$ | 20 | |
| | | | | C | 6 | |
| | 4 | 34 | 2 | $SiO_2$ | 36 | 65 |

TABLE 1-continued

| | | SiC Raw Material Powder Compounding Amount (weight %) | Sintering Additives ($B_4C$) Adding Amount (weight %) | Whisker Formation Agent Kinds | Whisker Formation Agent Adding Amount (weight %) | Transverse Rupture Strength (kg/mm²) |
|---|---|---|---|---|---|---|
| | | | | SiO | 16 | |
| | | | | C | 12 | |
| Comparative Example | 1 | 96 | 2.4 | $SiO_2$ | 0.5 | 49 |
| | | | | C | 0.1 | |
| | 2 | 25 | 2 | $SiO_2$ | 60 | 38 |
| | | | | C | 12 | |
| | 3 | 98 | 2 | — | — | 50 |

As seen from the above Table, the method of the invention improves the transverse rupture strength by more than 20% to thereby indicate the high effects of the invention.

As shown in the comparative examples 1 and 2, when the compounding amount of whisker formation agent was less than 1 wt.%, there was no effect and when more than 70 wt.%, the strength adversely lowers. Hence, it is judged that the addition of whisker formation agent of 1 to 70 wt.% is effective.

The whisker formation heat treatment temperature must be more than 1300° C. because no whisker formation occurs at a temperature of 1300° C. or less, but the whisker formation speed is slow at a temperature less than 1500° C. and granular growth occurs at a temperature more than 1750° C. so that a temperature from 1500° to 1750° C. is deemed preferable.

When the specimen of the invention was observed by a SEM as to its broken face after measurement of its transverse rupture strength, a fibrous structure in which whisker fibers of about 1 μm in diameter and 10 to 100 μm in length were entangled three-dimensionally with each other, was found, from which it was confirmed that the fiber reinforcement type mechanism had improved the transverse rupture strength.

In addition, the time period for the whisker formation heat treatment relates to the heat treatment temperature and usually need only be more than 0.5 hours at the above temperature range. The whiskers, which become longer fibers, were not seen to have such remarkable effects, whereby the heat treatment was deemed enough for the time period of 0.5 to 2 hours.

EXAMPLE 2

Crystalline $Si_3N_4$ powder, MgO powder of 5 wt.% as the sintering additives, and a whisker formation agent shown in Table 2, were ground and mixed by a usual ball mill for 50 hours, the mixed powder being molded under a pressure of 1.5 t/cm² by use of a metal mold of a predetermined shape, subjected to a heat treatment for two hours in an atmosphere of nitrogen of 400 Torr at 1450° C., and continuously held for one hour at a high temperature of 1750° C. in an atmosphere of nitrogen at one atmospheric pressure for the densifying sintering step.

A test piece of 4×3×40 mm was cut out from the sintered body and the transverse rupture strength was measured at a 30 mm span to observe the broken surface. The results of measurement and observation were tabulated in Table 2 below. In addition, the Table 2, No. 1, shows a material containing no whisker formation agent, which was subjected to a similar heat treatment under an atmosphere of nitrogen at 1450° C., and to a densifying-sintering step.

TABLE 2

| | | $Si_3N_4$ Raw Material Powder Compounding Amount (weight %) | Sintering Additives (MgO) Adding Amount (weight %) | Whisker Formation Agent Addion Amount (weight %) | Transverse Rupture Strength (kg/mm²) Room Temperature | Transverse Rupture Strength (kg/mm²) 1200° C. |
|---|---|---|---|---|---|---|
| Comparative Example | 1 | 95 | 5 | 0 | 75 | 40 |
| Example | 2 | 93 | 5 | Metal Si 2 | 80 | 55 |
| | 3 | 80 | 5 | SiO 15 | 85 | 58 |
| | 4 | 93 | 5 | Silicon Rubber 2 | 80 | 57 |
| | 5 | 80 | 5 | Amorphous $Si_3N_4$ 15 | 85 | 59 |
| | 6 | 80 | 5 | $SiO_2$/C = 1 mol/ 1 mol 15 | 83 | 58 |
| | 7 | 80 | 5 | Metal Si + Amorphous $Si_3N_4$ 1 mol/1 mol 15 | 82 | 57 |
| | 8 | 80 | 5 | SiO + Amorphous $Si_3N_4$ | 85 | 57 |

TABLE 2-continued

| | $Si_3N_4$ Raw Material Powder Compounding Amount (weight %) | Sintering Additives (MgO) Adding Amount (weight %) | Whisker Formation Agent Addion Amount (weight %) | Transverse Rupture Strength ($kg/mm^2$) Room Temperature | 1200° C. |
|---|---|---|---|---|---|
| | | | 1 mol/1 mol 15 | | |
| 9 | 50 | 5 | Amorphous $Si_3N_4$ 45 | 90 | 52 |
| 10 | 20 | 5 | Amorphous $Si_3N_4$ 75 | 88 | 53 |
| 11 | 90 | 5 | Metal Si 5 | 77 | 51 |
| 12 | 80 | 5 | Metal Si/ $SiO_2$ = 1 mol/1 mol 15 | 80 | 53 |

From the above Table, the sintered bodies by the method of the invention are improved in transverse rupture strength at room temperature and largely improved in strength at a high temperature of 1200° C., thereby indicating the improved effects of the invention. The compounding amount of whisker formation agent, when less than 1% or more than 75%, is less effective so that an amount from 1 to 75% is judged effective.

In addition, the whisker formation speed becomes extremely slow in the whisker formation heat treatment temperature of 1400° C. or less, which is not practical. Furthermore, in a temperature range of more than 1650° C., the densifying sintering is promoted on the way of whisker growth, which is less effective. Hence, a temperature range of 1400° to 1650° C. is the most preferable.

Upon observing the broken face of the specimen by a microscope after measuring the transverse rupture strength of the same, whisker fibers of about 1 μm in diameter and 10 to 50 μm in length were confirmed to be entangled three-dimensionally with each other so as to be formed in a fiber reinforced type.

In addition, the whisker formation heat treatment is enough for more than 0.5 hours. The treatment for a long time will form longer fibers, but when the heat treatment exceeds two hours, the specially remarkable effect was not recognized; thus the time for treatment is sufficient in a range from 0.5 to 2 hours.

EXAMPLE 3

$Al_2O_3$ of 2 wt.% and $Y_2O_3$ of 5 wt.% were used as the sintering additives instead of MgO of 5 wt.% and metal Si of 2 wt.% was used as the whisker formation agent, and the residual $Si_3N_4$ being of 91 wt.%.

The heat treatment and sintering were carried out the same as Example 2 except for using the above composition of raw material. Upon measuring the characteristics of the sintered body obtained, the transverse rupture strength was of 90 $kg/mm^2$ at a room temperature and 60 $kg/mm^2$ at 1200° C., which was improved the same as Example 2. As a result, it has been understood that the invention is effective regardless of the kinds of sintering additives.

EXAMPLE 4

The mixed powder the same as in Example 1 was held in a vacuum of $1 \times 10^{-3}$ Torr at 1550° C., press-molded by a metal mold under pressure of 2 $ton/cm^2$ after whisker formation heat treatment, and molded into a transverse rupture strength measuring specimen, the molded body being held under an atmosphere of argon at one atmospheric pressure and subjected to a densifying sintering operation.

After measuring the transverse rupture strength of the sintered specimen by the method the same as Example 1, the results were obtained as shown in Table 3.

TABLE 3

| | | SiC Raw Material Powder Compounding Amount (weight %) | Sintering Additives ($B_4C$) Adding Amount (weight %) | Whisker Formation Agent Kinds | Adding Amount (weight %) | Transverse Rupure Strength ($kg/mm^2$) |
|---|---|---|---|---|---|---|
| Example | 1 | 74 | 2 | $SiO_2$ | 20 | 65 |
| | | | | C | 4 | |
| | 2 | 76 | 2 | $SiO_2$ | 15 | 64 |
| | | | | Si | 2 | |
| | | | | C | 5 | |
| | 3 | 52 | 2 | Silicon Resin | 20 | 63 |
| | | | | $SiO_2$ | 20 | |
| | | | | C | 6 | |
| | 4 | 34 | 2 | $SiO_2$ | 36 | 65 |
| | | | | SiO | 16 | |
| | | | | C | 12 | |

EXAMPLE 5

The mixed powder the same as in Example 2 was subjected to a heat treatment for 2 hours in an atmosphere of nitrogen of 400 Torr at 1450° C. and then molded by use of mold of a predetermined shape under a pressure of 1.5 t/cm$^2$, the molded body having been held for one hour at a high temperature of 1750° C. in an atmosphere of nitrogen under pressure of one atmospheric pressure and subjected to a densifying-sintering step.

The sintered body specimen obtained was measured as to its transverse rupture strength by the same method as Example 2, the results of which are shown in Table 4.

As seen from comparison of Tables 1 and 3 and those of 2 and 4, even when the mixed powder is subjected to a heat treatment to previously produce the whiskers and then molded and sintered, the sintered body was found to have a characteristic about equivalent to that of sintered body which produced whiskers by heat treatment after molded.

EXAMPLE 6

SiC powder, sintering additives, whisker formation agents, and whisker formation accelerators, were compounded in composition shown in the Table 5 to produce the sintered body by the same method as Example 1.

After measurement of transverse rupture strength of sintered body specimen obtained, the results were given in Table 5.

TABLE 4

| | $Si_3N_4$ Raw Material Powder Compounding Amount (weight %) | Sintering Additives (MgO) Adding Amount (weight %) | Whisker Formation Agent Adding Amount (weight %) | Transverse Rupture Strength ($kg/mm^2$) Room Temperature | 1200° C. |
|---|---|---|---|---|---|
| Example 1 | 93 | 5 | Metal Si 2 | 81 | 54 |
| 2 | 80 | 5 | SiO 15 | 88 | 60 |
| 3 | 93 | 5 | Silicon Rubber 2 | 79 | 55 |
| 4 | 80 | 5 | Amorphous $Si_3N_4$ 15 | 87 | 60 |
| 5 | 80 | 5 | $SiO_2$/C = 1 mol/1 mol is | 82 | 56 |
| 6 | 80 | 5 | Metal Si + Amorphous $Si_3N_4$ 1 mol/1 mol 15 | 80 | 58 |
| 7 | 80 | 5 | SiO + Amorphous $Si_3N_4$ 1 mol/1 mol 15 | 81 | 55 |
| 8 | 50 | 5 | Amorphous $Si_3N_4$ 45 | 89 | 54 |
| 9 | 20 | 5 | Amorphous $Si_3N_4$ 75 | 90 | 55 |
| 10 | 90 | 5 | Metal Si 5 | 76 | 50 |
| 11 | 80 | 5 | Metal Si/$SiO_2$ = 1 mol/1 mol 15 | 79 | 52 |

TABLE 5

| | SiC Raw Material Powder Compounding Amount (weight %) | Sintering Additives ($B_4C$) Adding Amount (weight %) | Whisker Formation Agent Kinds | Whisker Formation Agent Adding Amount (weight %) | Whisker Formation Accelerator Kinds | Whisker Formation Accelerator Adding Amount (weight %) | Transverse Rupture Strength ($kg/mm^2$) Room Temperature | 1200° C. |
|---|---|---|---|---|---|---|---|---|
| Example 1 | 73 | 2 | $SiO_2$<br>C | 20<br>4 | Fe | 1 | 74 | 72 |
| 2 | 73 | 2 | $SiO_2$<br>Si<br>C | 15<br>2<br>5 | Ti | 3 | 72 | 69 |
| 3 | 47 | 2 | Silicon Resin<br>$SiO_2$<br>C | 20<br>20<br>6 | Mo | 5 | 74 | 71 |
| 4 | 31 | 2 | $SiO_2$<br>SiO<br>C | 36<br>16<br>12 | Fe—Cr | 3 | 72 | 70 |
| 5 | 73 | 2 | $SiO_2$<br>C | 20<br>4 | Co | 1 | 71 | 69 |
| 6 | 95 | 2.2 | $SiO_2$ | 1.5 | V | 1 | 72 | 70 |

TABLE 5-continued

| | SiC Raw Material Powder Compounding Amount (weight %) | Sintering Additives (B₄C) Adding Amount (weight %) | Whisker Formation Agent Kinds | Whisker Formation Agent Adding Amount (weight %) | Whisker Formation Accelerator Kinds | Whisker Formation Accelerator Adding Amount (weight %) | Transverse Rupture Strength (kg/mm²) Room Temperature | Transverse Rupture Strength (kg/mm²) 1200° C. |
|---|---|---|---|---|---|---|---|---|
| | | | C | 0.3 | | | | |
| 7 | 73 | 2 | $SiO_2$<br>Si<br>C | 15<br>2<br>5 | W | 3 | 73 | 72 |
| 8 | 73 | 2 | SiO<br>Si<br>C | 15<br>2<br>5 | Fe—Ni—Cr | 3 | 71 | 68 |

EXAMPLE 7

Crystalline $Si_3N_4$ powder, sintering additives, whisker formation agents, and whisker formation accelerators, were compounded in the composition shown in Table 6 to be formed in a sintered body by the same method as Example 2 so that the transverse rupture strength was measured. The results of measurement were shown in Table 6.

TABLE 6

| | $Si_3N_4$ Powder (weight %) | Sintering Additives (MgO) (weight %) | Whisker Formation Agent (weight %) | Whisker Formation Accelerator (weight %) | Transverse Rupture Strength (kg/mm²) Room Temperature | Transverse Rupture Strength (kg/mm²) 1200° C. |
|---|---|---|---|---|---|---|
| 1 | 93.5 | 5 | SiO 1 | Fe 0.5 | 78 | 40 |
| 2 | 79.5 | 5 | SiO 15 | Ti 0.5 | 83 | 50 |
| 3 | 44.5 | 5 | SiO 50 | Mo 0.5 | 90 | 56 |
| 4 | 19.5 | 5 | SiO 75 | Fe 0.5 | 75 | 43 |
| 5 | 79.9 | 5 | Metal Si 15 | Ni 0.1 | 85 | 53 |
| 6 | 79.99 | 5 | Amorphous $Si_3N_4$ 15 | Co 0.01 | 86 | 53 |
| 7 | 74.5 | 5 | $SiO_2$/C = 1 mol/1 mol 20 | Cr 0.5 | 88 | 54 |
| 8 | 74.5 | 5 | Si/$SiO_2$ = 1 mol/1 mol 20 | W 0.5 | 89 | 55 |
| 9 | 79.7 | 5 | Silicon Rubber 15 | V 0.3 | 83 | 53 |
| 10 | 74.99 | 5 | Amorphous $Si_3N_4$ 20 | Fe 0.01 | 85 | 55 |
| 11 | 70 | 5 | Amorphous $Si_3N_4$ 20 | Fe 5 | 80 | 45 |
| 12 | 74.5 | 5 | Amorphous $Si_3N_4$ 20 | Fe—Cr 5 | 88 | 57 |
| 13 | 74.7 | 5 | Si/$SiO_2$ = 1 mol/1 mol 20 | Fe—Ni—Cr 0.3 | 89 | 56 |

It was recognized from Tables 5 and 6 that the whisker formation accelerator was added to allow the whisker growth to prevail sufficiently through the sintered material to thereby improve the strength more than the case of the non-addition of the same.

Also, the whisker formation accelerator of in an amount of 0.01% or less is less effective and that exceeding 5% is effective to improve the formation acceleration, but its metal component will deteriorate the high temperature characteristics and corrosion resistance, whereby a range of 0.01 to 5% was recognized to be effective. In addition, iron and ferroalloys to be added are especially effective as the whisker formation accelerators.

EXAMPLE 8

SiC powder, sintering additives, whisker formation agents, and whisker formation accelerators, were compounded in the composition shown in Table 7 to form a sintered body by the same method as Example 4 to thereby measure the transverse rupture strength, the results of measurement having been shown in Table 7.

TABLE 7

| | | SiC Raw Material Powder Compounding Amount (weight %) | Sintering Additives ($B_4C$) Adding Amount (weight %) | Whisker Formation Agent Kinds | Whisker Formation Agent Adding Amount (weight %) | Whisker Formation Accelerator Kinds | Whisker Formation Accelerator Adding Amount (weight %) | Transverse Rupture Strength (kg/mm²) Room temperature | Transverse Rupture Strength (kg/mm²) 1200° C. |
|---|---|---|---|---|---|---|---|---|---|
| Example | 1 | 73 | 2 | $SiO_2$<br>C | 20<br>4 | Fe | 1 | 73 | 71 |
| | 2 | 73 | 2 | $SiO_2$<br>Si<br>C | 15<br>2<br>5 | Ti | 3 | 72 | 67 |

TABLE 7-continued

| | SiC Raw Material Powder Compounding Amount (weight %) | Sintering Additives ($B_4C$) Adding Amount (weight %) | Whisker Formation Agent | | Whisker Formation Accelerator | | Transverse Rupture Strength (kg/mm$^2$) | |
|---|---|---|---|---|---|---|---|---|
| | | | Kinds | Adding Amount (weight %) | Kinds | Adding Amount (weight %) | Room temperature | 1200° C. |
| 3 | 47 | 2 | Silicon Resin | 20 | Mo | 5 | 74 | 72 |
| | | | $SiO_2$ | 20 | | | | |
| | | | C | 6 | | | | |
| 4 | 31 | 2 | $SiO_2$ | 36 | Fe—Cr | 3 | 73 | 70 |
| | | | SiO | 16 | | | | |
| | | | C | 12 | | | | |
| 5 | 73 | 2 | $SiO_2$ | 20 | Co | 1 | 72 | 69 |
| | | | C | 4 | | | | |
| 6 | 95 | 2.2 | $SiO_2$ | 1.5 | V | 1 | 73 | 71 |
| | | | C | 0.3 | | | | |
| 7 | 73 | 2 | $SiO_2$ | 15 | W | 3 | 73 | 69 |
| | | | Si | 2 | | | | |
| | | | C | 5 | | | | |
| 8 | 73 | 2 | $SiO_2$ | 15 | Fe—Ni—Cr | 3 | 70 | 67 |
| | | | Si | 2 | | | | |
| | | | C | 5 | | | | |

EXAMPLE 9

Crystalline $Si_3N_4$ powder, sintering additives, whisker formation agents, and whisker formation accelerators, were compounded in the composition shown in Table 8 to produce a sintered body by the same method as Example 2, and the transverse rupture strength measured. The results of measurement are shown in Table 8.

TABLE 8

| | | $Si_3N_4$ Powder (weight %) | Sintering Additives (MgO) (weight %) | Whisker Formation Agent (weight %) | Whisker Formation Accelerator (weight %) | Transverse Rupture Strength (kg/mm$^2$) Room Temperature | 1200° C. |
|---|---|---|---|---|---|---|---|
| Comparative Example | 1 | 95 | 5 | 0 | 0 | 70 | 38 |
| | 2 | 93 | 5 | Metal Si 2 | 0 | 80 | 53 |
| | 3 | 93 | 5 | 0 | Fe 0.01 | 65 | 35 |
| Example | 4 | 91 | 5 | Metal Si 2 | Fe-Cr 0.2 | 85 | 60 |
| | 5 | 77 | 5 | SiO 15 | Ni 0.3 | 88 | 63 |
| | 6 | 88 | 5 | Silicon Rubber 2 | W 0.5 | 86 | 61 |
| | 7 | 15 | 5 | Amorphous $Si_3N_4$ 75 | Ti 0.5 | 85 | 64 |
| | 8 | 77 | 5 | $SiO_2$/C = 1 mol/1 mol 15 | V 5 | 84 | 60 |
| | 9 | 76 | 5 | SiO/Amorphous $Si_3N_4$ = 1/1 15 | Cr 0.4 | 83 | 61 |

EXAMPLE 10

Sintering additives of $Al_2O_3$ of 2 wt.% and $Y_2O_3$ of 5 wt.%, a whisker formation agent of amorphous $Si_3N_4$ of 20 wt.%, a whisker formation accelerator of Fe of 0.5 wt.%, and residual $Si_3N_4$ powder, were compounded and subjected to the same treatment as in Example 2. The sintered body obtained had a characteristic of transverse rupture strength of 90 kg/mm$^2$ at a room temperature and that of 60 kg/mm$^2$ at a high temperature of 1200° C. similar to that of Example 7.

Hence, it was clarified that the present invention was effective regardless of the kinds of sintering additives.

What is claimed is:

1. A method for manufacturing a fiber reinforced silicon carbide or silicon nitride ceramic sintered body having silicon carbide or silicon nitride ceramic whiskers dispersed therein, said method comprising mixing together silicon carbide or silicon nitride ceramic powder, 1-75% by weight of whisker formation agents selected from the group consisting of at least one metal Si, an inorganic compound containing Si, an organic compound containing Si, an amorphous silicon ceramic powder, and a mixture of $SiO_2$ and carbon, or a mixture of $SiO_2$ and Si; sintering additives, and a whisker formation accelerator, which is at least one metal or alloy thereof selected from the group consisting of Fe, Ni, Co, Cr, V, Ti, Ta, W and Mo; molding said mixture into a predetermined shape; heat treating said molded body in a non-oxidizing atmosphere at temperatures of 1300° C. to 1750° C. to produce silicon carbide or silicon nitride whiskers in said molded body; and thereafter further densifying and sintering said molded body at sintering temperatures in a non-oxidizing atmosphere.

2. A method for manufacturing a fiber reinforced silicon carbide or silicon nitride ceramic sintered body in which silicon carbide or silicon nitride ceramic whiskers are dispersed therein, said method comprising mixing together silicon carbide or silicon nitride ceramic powder, 1-75% by weight of whisker formation agents selected from the group consisting of at least one metal Si, an inorganic compound containing Si, an organic compound containing Si, an amorphous silicon ceramic powder, and a mixture of $SiO_2$ and carbon, or a mixture of $SiO_2$ and Si; sintered additives, and a whisker accelerating amount of a whisker formation accelerator which is at least one metal or alloy thereof selected from the group consisting of Fe, Ni, Co, Cr, V, Ti, Ta, W and Mo; applying to said mixture a heat treatment of 1300° to 1750° C. to produce silicon carbide or silicon nitride whiskers; molding said mixtures into a predetermined shape; and thereafter densifying and sintering said molded body at sintering temperatures in a non-oxidizing atmosphere.

3. A method for manufacturing a fiber reinforced silicon carbide or silicon nitride sintered body according to claim 1, wherein the whisker accelerating agents are used in amounts of 0.01 to 5 wt.%.

4. A method of manufacturing a fiber reinforced silicon carbide or silicon nitride sintered body according to claim 2 wherein the whisker accelerating agents are used in amounts of 0.1 to 5 wt.%.

5. A method of manufacturing a fiber reinforced silicon carbide or silicon nitride sintered body according to claim 1, wherein the whiskers have a length of about 40 to 50 μm.

6. A method of manufacturing a fiber reinforced silicon carbide or silicon nitride sintered body according to claim 2, wherein the whiskers have a length of about 40 to 50 μm.

* * * * *